June 23, 1964  L. R. JONES, JR  3,138,776
CALIBRATED RESISTANCE-THERMOMETERS AND THE LIKE
Filed Jan. 5, 1961  3 Sheets-Sheet 1
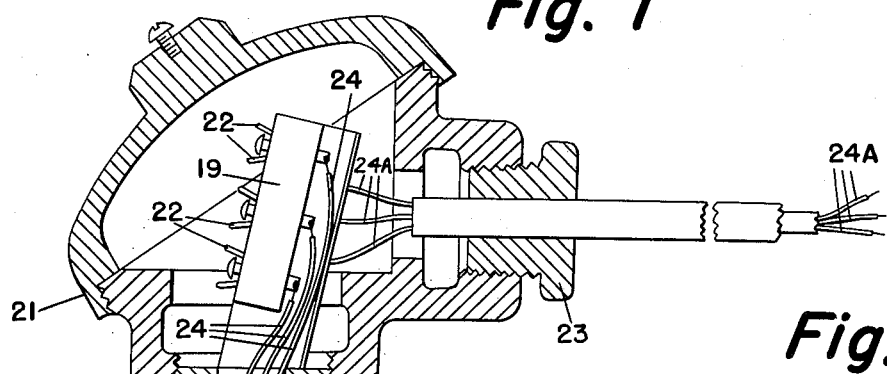
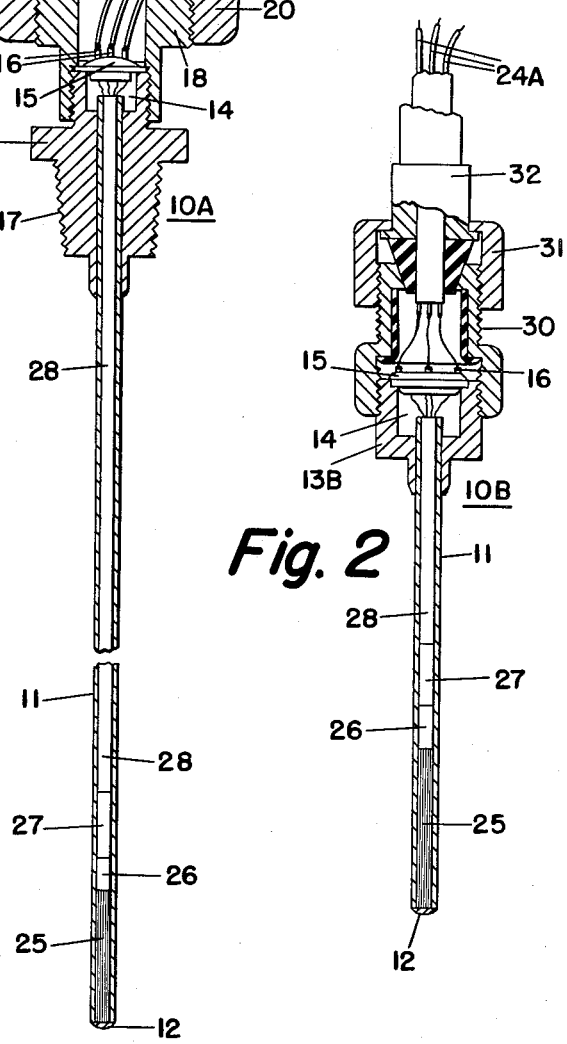
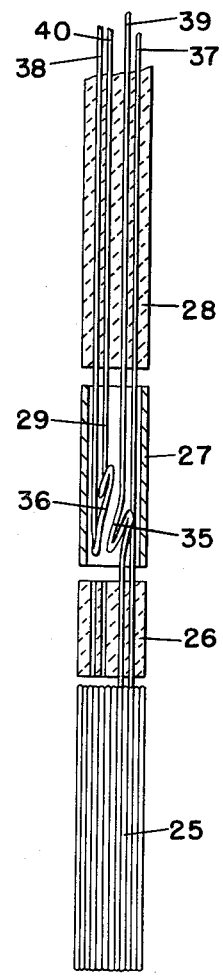

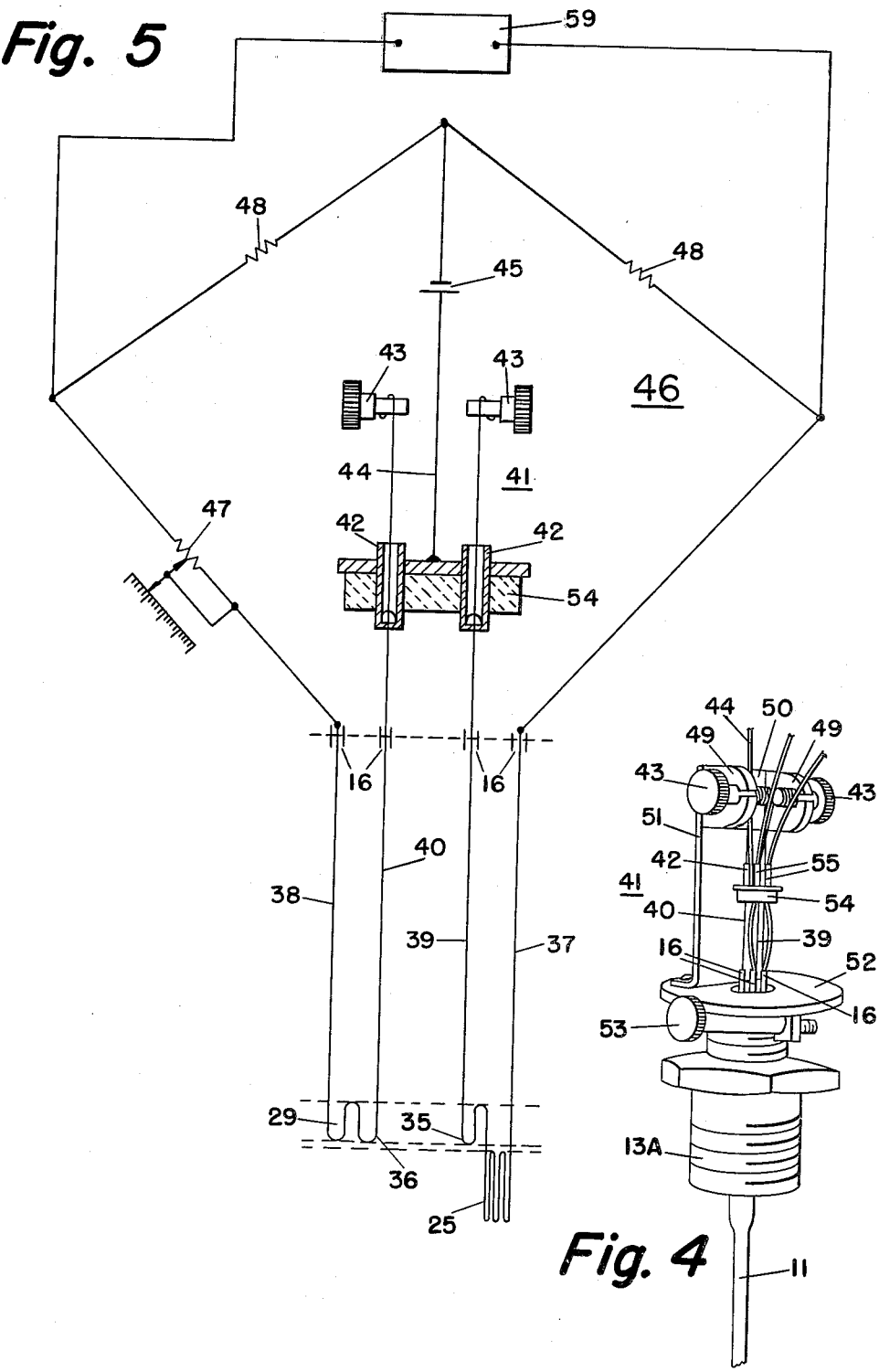

United States Patent Office 3,138,776
Patented June 23, 1964

3,138,776
CALIBRATED RESISTANCE-THERMOMETERS
AND THE LIKE
Louis R. Jones, Jr., Abington, Pa., assignor to Leeds and
Northrup Company, Philadelphia, Pa., a corporation
of Pennsylvania
Filed Jan. 5, 1961, Ser. No. 80,938
9 Claims. (Cl. 338—28)

This invention is concerned with temperature-compensated condition-responsive devices and particularly with the calibration and construction of temperature-compensated resistance-thermometers.

In accordance with the invention, after assembly of a condition-responsive element and a temperature-compensating loop with their mounting structure, they are connected in adjacent arms of a bridge circuit with one lead from the element and one lead from the loop temporarily adjustably connected to the junction terminal of the adjacent bridge arms. Both of these leads are provided with slack and the length of one or the other, or both, of the leads to the junction terminal is adjusted until the bridge is balanced with the resistance of the compensating loop including its leads equal to the resistance of the leads from the condition-responsive device. These leads are then permanently connected to terminal means on the mounting structure to provide a calibrated temperature-compensated unit.

In the case of resistance-thermometers, to which this invention is particularly directed, the aforesaid calibrating adjustment is preferably effected after the assembly has been subjected to an annealing operation which relieves work-hardening stresses incident to formation and assembly of the condition-responsive element. These stresses otherwise cause drift from the calibrated resistance value of the device.

More particularly, the condition-responsive element of a resistance-thermometer is made by repeatedly folding a loop of wire to form a wad or plug snugly fitted into the closed end of a protective casing with integral leads extending to the other end of the casing. The compensating loop which is disposed intermediate the ends of the casing is made from another length of similar wire and its integral leads also extend to said other end of the casing. For calibration purposes, slack is left in one lead of each loop and after the aforesaid balancing adjustment of the lead length, they are permanently connected to terminal structure of a sealing member for said other end of the casing.

The invention further resides in a resistance-thermometer device having features of construction, combination and arrangement hereinafter desrcibed and claimed.

For a more complete understanding of the invention and for illustration of preferred forms of resistance-thermometers embodying the invention, reference is hereinafter made to the accompanying drawings in which:

FIG. 1 is a sectional view, on enlarged scale, of a miniature resistance-thermometer device having one type of mounting bushing and head assembly;

FIG. 2 is a sectional view, on enlarged scale, of a similar miniature resistance-thermometer device with a different type of mounting bushing and head assembly;

FIG. 3 is a sectional view, on further enlarged scale, of internal elements of the resistance-thermometers shown in FIGS. 1 and 2;

FIG. 4 is a perspective view of a calibrating device temporarily mounted on the resistance-thermometer for adjustment of lead length;

Figure 7:
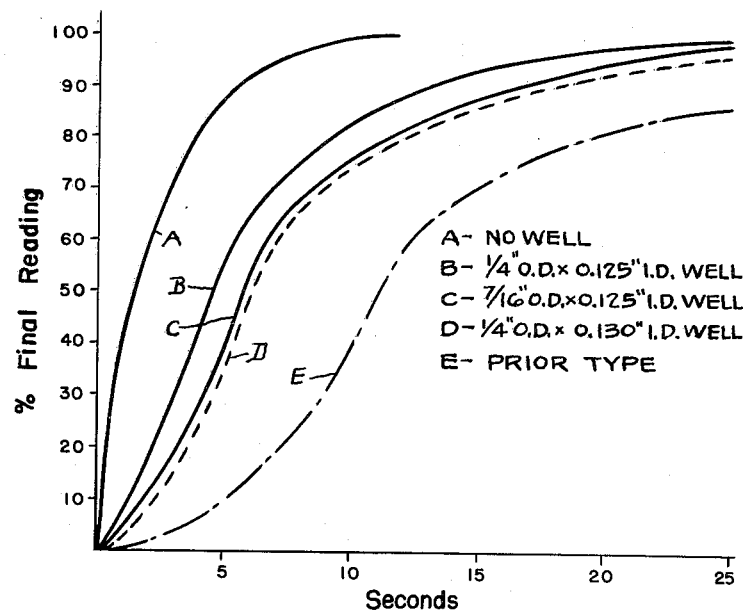
Figure 6:
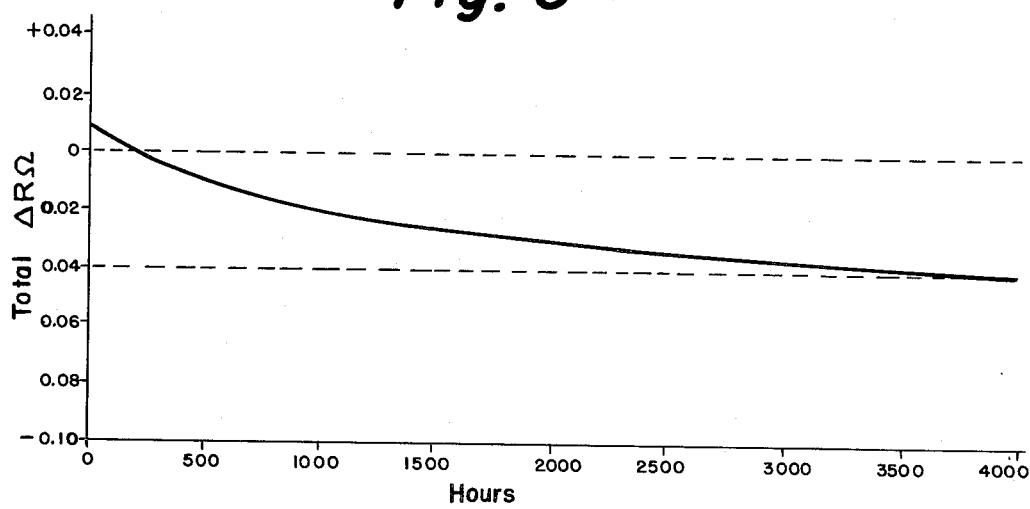

FIG. 5 schematically illustrates a calibrating circuit including the calibrating device of FIG. 4; and FIGS. 6 and 7 are performance curves referred to in discussion of the operating characteristics of the resistance-thermometers of preceding figures.

Referring to FIG. 1, the resistance-thermometer unit 10A comprises an elongated protective casing or tube 11 of metal or other suitable material such as quartz, and whose lower end 12 is closed as by welding or other techniques. The upper portion of tubing 11 passes through and is attached, as by brazing, to the mounting bushing 13A. The open upper end of tubing 11 projects into a recess 14 in the upper end of the mounting bushing. This recess is sealed by the header 15 having a metal flange which is brazed or welded to the top of the mounting bushing. The central or body portion of the header is of glass or other insulating material through which extend the feed-through terminals 16 which, as later described, are connected to leads of circuit elements of the unit 10A which are disposed within the protective casing 11.

For screwing of unit 10A into a threaded opening of a furnace, of a flow pipe or other cavity, or into a thermometer well in such cavity, not shown, the lower end of the mounting bushing 13A is externally threaded at 17. The upper end of the mounting bushing is externally threaded to receive the coupling 18 which is screwed into the housing 20 and which supports the connection block 19. The removable cover 21 of the housing affords access to the connection block 19 for fastening to its terminals 22 the leads 24A which extend through cable bushing 23 to a remote measuring circuit. The internal conductors 24 connect the terminals 22 of the connection block 19 to corresponding terminals 16 of the thermometer unit 10A.

The condition-responsive or sensitive element 25 of unit 10A is a plug or wad formed of many convolutions of insulated wire which is snugly fitted into the lower closed end of the tube 11. The leads from this element extend through a short insulator 26, a spacer sleeve 27, and a long insulator 28 to the upper open end of tube 11 where they are connected to feed-through terminals 16 of the sealing header 15. Within the tube 11, there is also disposed a compensating loop 29 (FIG. 3) which terminates within spacer sleeve 27 and which includes leads extending upwardly through the long insulator 28 to the upper open end of tube 11 for connection to feed-through terminals 16 of the header 15 of the unit. In FIG. 3, the two insulators 26, 28 and the intervening spacer sleeve are shown separated, but as assembled in tube 11 they form a continuous ram-rod holding the temperature-sensitive plug element 25 in place at the closed end of tube 11. Also as shown in FIG. 3, the sleeve 27 defines a chamber in which one of the leads of the compensating loop 29 and one of the leads from the plug 25 each has a slack portion which as later described is used for precise calibration of the unit.

Except for the different end bushing 13B, the resistance-thermometer unit 10B shown in FIG. 2 is similar in construction to unit 10A of FIG. 1. The corresponding elements of both units are identified in FIGS. 1 and 2 by the same reference characters so that the above description of unit 10A is applicable to unit 10B and need not be repeated. In this unit, the threaded bushing 13B receives the lower end of a coupling sleeve 30 whose upper end is externally threaded to receive a clamping collar 31 for the cable fitting 32. Interiorly of the coupling sleeve 30, the cable conductors 24A are connected to the terminals 16 of unit 10B so to connect the temperature-responsive plug and compensating unit of unit 10B to a remote measuring circuit. The resistance-thermometer unit so mounted at the end of a flexible cable may be used as a probe: the unit 10A of FIG. 1 may be similarly mounted for use as a probe. By way of example, the effective probe length of units 10A and 10B may be about three inches or the exposed length of tube 11 of units 10A and 10B may vary widely and may be from less than a foot to several feet depending upon the requirements of different installations.

In the preferred construction of both units, the protective tube 11 is slightly less than one-eighth inch in external diameter (0.120″) and is of thin-wall metal, usually stainless steel. A 10-ohm temperature-sensitive plug 25 snugly fitting the internal bore of such tube and extending about an inch from the closed end can be made by repeatedly folding a loop of glass-insulated #39 hand-drawn platinum wire. The average length of such wire required to form an annealed element having a resistance of 10 ohms at 0° C. is 28.1″, although because of wire-manufacturing variations such length may vary from about 27.6″ to 28.7″ for different spools of #39 wire. The leads for connecting such folded winding to the terminals 16 of the unit are integral continuations of the wire from which the temperature-sensitive plug is made so to avoid brazed joints within the unit. Such joints are a source of contact potentials causing measurement error and a source of corrosion attack and mechanical failure due to stresses arising in temperature cycling.

Thus to make the winding leg (temperature-sensitive winding 25 plus its leads 37, 39), a length of wire cut is about two inches greater than the sum of the winding length and the total lead length. The free ends of the leads are threaded through the two insulators 26, 28 and the intervening spacer sleeve 27 leaving a slack loop 35 of about ¾″ within the spacer sleeve and a hair-pin loop of about 14$\frac{1}{16}$″ below the short insulator 26. This long hair-pin loop is folded on itself four times to form a wad or plug approximately ⅞″ long which, when squeezed, is of overall diameter closely fitting into casing 11.

Another length of the same wire is cut to form the compensating leg including the compensating coil 29 and its integral leads 38, 40. The free ends of the leads are threaded through the long insulator 28 leaving within the spacer sleeve 27 a hair-pin loop having a slack loop 36 of about ¾″ in one side.

The folded winding plug 25 is pushed down into the protective tube 11, using the short insulator 26, spacer 27 and long insulator 28 as a ram, until the plug 25 engages the closed end 12 of the tube. The convolutions of the temperature-sensitive winding are thus in intimate heat-transfer relation with the tube at and adjacent the closed end thereof and with each other. The bared ends of the four leads from the compensating loop 29 and the temperature-sensitive element 25 are respectively threaded through the four feed-through terminals 16 of the sealer-header 15 whose metal flange is then brazed to the top face of the mounting plug 13A (FIG. 1) or 13B (FIG. 2).

The two leads 37, 38 of the winding and compensating legs respectively are sealed off by brazing them to the corresponding feed-through terminals 16. The other two leads 39, 40 having the slack loops 35, 36 in spacer sleeve 27 are left extending freely through their terminals 16 to a calibrating fixture 41 (FIG. 4) which is temporarily attached to the mounting bushing 13A (or 13B) of the unit 10A (or 10B). Basically, and as shown in FIG. 5, this fixture comprises two small metal tubes 42, held in fixed relative position in a mount 54. The tubes 42 are closed at the bottom except for a small hole through which a corresponding one of leads 39, 40 passes to a corresponding one of the adjusting pins 43, 43. Each of the tubes 42 is partially filled with mercury and is connected by lead 44 to the current supply source 45 of a Wheatstone bridge circuit 46.

The compensating leg including compensating loop 29 with its leads 38, 40 is connected in one arm of the bridge 46 in series with a calibrating resistor 47. The resistor 47 is selected or adjusted to have at a selected calibration temperature the same resistance as the desired resistance of the temperature-sensitive winding 25 which is connected in an adjacent arm of the calibrating bridge circuit. Thus, assuming the resistances 48, 48 in the ratio arms of the bridge are of equal value, the value of resistor 47 is precisely 10 ohms for the specific example under discussion. With the sensitive end of the unit 10A (or 10B) in an ice bath to afford a reference temperature of 0° C., one, or the other, or both of the slack leads 39, 40 are shortened by turning of the corresponding pin 43 until the bridge is precisely balanced as indicated by null response of the detector 59 which preferably includes a high-gain amplifier for detection of unbalances as small as a few microvolts. Pulling the slack loop lead 40 decreases the compensating leg resistance and hence effectively increases the winding leg resistance if the ice point reading is too low: conversely, pulling the slack winding lead 39 decreases the resistance for high ice point readings. The amount of slack specified allows sufficient adjustment to cover a range of ±12° F. which is more than ample to compensate for differences in the resistance per unit length in wires from different spools, for slight differences in measured length, and in actual mounting of the wire.

Thus with this calibrating fixture 41, the unit 10A or 10B can be quickly and precisely calibrated to within ±0.002 ohm which is approximately equivalent to 0.1° F. After calibration, the leads 39 and 40 are sealed, as by brazing to their terminals 16, which are then connected together jointly to provide the common terminal of the unit. The resistance of the compensating leg is equal to the resistance of the leads 37, 39 of the temperature sensitive winding, and since the wire of the leads 37, 39 has the same temperature coefficient of resistance as the wire of the compensating leg, these two resistances remain equal at all temperatures to which the calibrated unit is subjected.

Reverting to FIG. 4, the slack-adjusting pins 43, 43 of the fixture 41 are frictionally gripped by the split legs 49 of a U-bracket 50 fastened at the upper end of a support member 51. The lower end of support 51 is attached to the base member 52 which has an opening to clear the header terminal 16 of the unit to which the fixture is clamped as by means including the clamping screw 53. The assembly comprising tubes 42 and their mount 54 is slidable on the leads but during calibration may be held immediately above the terminals 16 of the unit being calibrated. As shown in FIG. 4, this assembly also has two feed-through terminals 55 insulated from each other and through which extend heavy external leads which are electrical continuations of the internal leads 37, 38 previously sealed into one pair of feedthrough terminals 16. These feedthrough terminals 55 serve as guides so that after calibration the assembly may be raised slightly, for brazing of the adjusted leads 39, 40 to their pair of header feedthrough terminals 16, without disturbing the adjustment. After such brazing, the leads 39, 40 are cut off at the terminal tips and the calibrating fixture removed.

The units described are suited for highly accurate measurement of temperature in the range of from about −325° F. to 1100° F. The basic accuracy is ±0.5° F. At prolonged temperatures much above 1100° F. to 1150° F. there is danger of contamination of the platinum by the glass insulation. The insulation resistance of these units is over 100 megohms which is of importance in grounded measuring systems since even at 1000° F. the measuring error due to insulation resistance is inconsequential—less than 0.006° F.

The curve shown in FIG. 6 is exemplary of the resistance stability of the units constructed as above described. After repeated cycling of temperature to which the units were exposed between room temperature and 1000° F., the maximum departure of the resistance of the winding 25 from its calibrated value was less than 0.5% throughout a period of 4000 hours at which time the departure became essentially constant. It was concluded that this small drift from the calibration value was due to relieving work-hardening stresses incident to forming of the winding plug 25. In making subsequent units, they were annealed for an hour at 1150° F. after assembly in the protective casing 11 and then calibrated. The annealed units after high-temperature test for a comparable period of time exhibited a calibration change of less than 0.1%.

As shown by curve A of FIG. 1, the units described (absent a well) have a high speed of response. The time required to reach final reading when removed from an ice bath to a 50° C. stirred water bath was approximately ten seconds. The time required to indicate 63.2% of a step change (time constant) was 2.4 seconds. In applications requiring use of a well, it is important that the difference between the external diameter of the casing 11 and the internal diameter of the well casing be as small as possible consistent with easy removal of the unit 10A under any conditions of temperature cycling or extreme gradient that may be encountered in use: a diameter difference of 0.005" has been found suitable. As shown by curves B and D, increasing the internal diameter of otherwise similar wells by as little as 0.005" can very appreciably increase the time-constant of the well-mounted unit. Increasing the wall thickness of the well to meet the requirements of a particular installation unavoidably increases the time-constant as evident from comparison of curves B and C but as there shown increases the external diameter from ¼" to 7/16" has less effect upon time-constant than increasing the clearance between casing 11 and the well by as little as 0.005" (curves B and D).

All of the well-mounted units, a shown by curves B to D, have a much higher speed of response than that of more costly and widely used well-mounted units in which the temperature-sensitive winding is wound on a bobbin and in which the protective casing and its well are of specially tapered shape at the sensitive end in effort to obtain a high speed of response exemplified by curve E.

Without any evidence of injury and with no change in calibration, resistance-thermometer units of the construction described have been subjected for 16 hours to severe vibration tests similar to that outlined in Government Specification Mil. E–5272A for Electrical components.

It shall be understood that copper, nickel, tungsten or other resistance-thermometer wire may be used instead of platinum for both the temperature-sensitive winding and the compensating leg or loop. By using integral leads for the winding 25 and the compensating loop, there are avoided brazed connections which give rise to thermal potentials and are a source of corrosion attack and mechanical failures due to temperature stresses. A resistance-thermometer unit so constructed will match the temperature-response curve of the wire chosen over the complete operating temperature range.

What is claimed is:

1. A temperature-compensated resistance-thermometer assembly comprising a protective casing having a closed end, means for sealing the other end of said casing comprising a header having at least three feed-through terminals, a multi-folded loop of wire forming a plug snugly fitting within said casing and with one end thereof engaging the closed end of said casing, a short apertured insulator within said casing and engaging the other end of said folded wire plug, a long apertured insulator extending inwardly from said other end of the casing, a spacer sleeve between said insulators, said multi-folded loop having integral leads extending through said apertured insulators and said spacer sleeve to said header and there connected to one pair of said terminals, one of said leads having slack within the spacer sleeve for adjustment of the total resistance of said multi-folded loop and its leads, and a temperature-compensating loop within said spacer sleeve having integral leads extending through said long insulator to said header and there connected to another pair of said terminals, one of said leads having slack within the spacer sleeve for adjustment of the resistance of said compensating loop including its leads to equal the resistance of the leads from said multi-folded loop.

2. A temperature-compensated resistance-thermometer assembly comprising a protective casing having a closed end, a multi-folded loop of wire forming a plug snugly fitting within said casing and with one end thereof engaging the closed end of said casing, a short apertured insulator within said casing and engaging the other end of said folded wire plug, a long apertured insulator extending inwardly from the open end of said casing, a spacer sleeve between said insulators, said multi-folded loop having integral leads extending through said apertured insulators and said spacer sleeve to the open end of said casing, one of said leads having slack within the spacer sleeve for adjustment of the total resistance of said multi-folded loop and its leads, and a temperature-compensating loop within said spacer sleeve having integral leads extending through said long insulator to the open end of said casing, one of said leads having slack within the spacer sleeve for adjustment of the resistance of said compensating loop including its leads to equal the resistance of the leads from said multi-folded loop.

3. A temperature-compensated resistance-thermometer assembly comprising a protective casing, a folded wire loop within said casing at one end thereof for change of its resistance in response to temperature changes, said folded loop having integral leads extending to the other end of said casing, one of said leads having slack for adjustment of the total resistance of the folded loop and its leads after annealing in situ, and a temperature-compensating loop within said casing intermediate the ends thereof and having integral leads extending to said other end of the casing, one of said leads having slack for adjustment of the total resistance of the compensating loop including its leads after annealing in situ to equal the resistance of the leads from said folded loop, said loops and their integral leads being of wire having the same temperature coefficient of resistance.

4. A temperature-compensated resistance-thermometer assembly comprising a protective casing having a closed end, means for sealing the other end of said casing including a header having at least three feed-through terminals, a multi-folded loop of wire snugly fitting within said casing at and adjacent its closed end and having integral leads extending therefrom interiorly of said casing to said header and there respectively connected to one pair of said terminals, and a temperature-compensating loop within said casing intermediate said folded loop and said header and having integral leads extending interiorly of said casing to said header and there connected to another pair of said terminals, both of said loops and their leads being of wire having the same temperature coefficient of resistance and the resistance of said compensating loop including its leads being equal to the resistance of the leads to said folded loop.

5. A temperature-compensated resistance-thermometer assembly comprising a protective casing, a folded loop of wire within said casing at one end thereof, said loop having integral leads extending therefrom to the opposite end of said casing, and a temperature-compensating loop within said casing intermediate the ends thereof, said compensating loop being of wire having the same temperature coefficient of resistance as that of said folded loop and having integral leads extending to said opposite end of said casing, the total resistance of said compensating loop including its said leads being equal to the resistance of the leads from said folded loop.

6. A resistance-thermometer comprising an elongated tube having a closed end, and a multi-folded loop of wire compressed into a plug snugly fitted into said tube at its closed end with leads extending to the other end of said tube, the convolutions of the folded loop of wire of said plug as compressed substantially filling the tubular space within said tube at and adjacent the closed end thereof with the convolutions in intimate heat-transfer relation to each other and to the tube throughout the inner periphery thereof for rapid response to changes in temperature of the tube.

7. A temperature-compensated resistance-thermometer comprising an elongated metal tube having a closed end, a multi-folded loop of wire compressed into a plug snugly fitted into said tube at its closed end with leads extending to the other end of said tube, a temperature-compensating loop within said tube intermediate the ends thereof with leads extending to said other end of the tube, and means for sealing the other end of said tube having feed-through terminals for said leads, at least one of said leads having slack for adjustment to match the resistance of the compensating loop including its leads to the resistance of the leads from said multi-folded loop.

8. A temperature-compensated condition-responsive unit comprising an elongated mounting structure having terminals at one end thereof, a condition-responsive element at the other end of said mounting structure and having leads respectively extending to two of said terminals, and a temperature-compensating loop intermediate the ends of said mounting structure and having leads extending respectively to one of said two terminals and to a third terminal, said compensating loop and its leads having the same temperature coefficient of resistance as the leads of said condition-responsive element and at least one of the leads to the common terminal having slack for adjustment to equality of the total resistance of the compensating loop and its leads with the resistance of the leads from said condition-responsive element.

9. A temperature-compensated condition-responsive unit comprising an elongated mounting structure, a condition-responsive element at one end of said mounting structure and having integral leads extending to the other end of said mounting structure, and a temperature-compensating loop intermediate the ends of said mounting structure and having integral leads extending to said other end of said mounting structure, said compensating loop and its leads having the same resistance and the same temperature coefficient of resistance as the leads of said condition-responsive element.

References Cited in the file of this patent

UNITED STATES PATENTS

| | | |
|---|---|---|
| 2,499,575 | Eddison et al. | Mar. 7, 1950 |
| 2,590,041 | Roost | Mar. 18, 1952 |
| 2,612,047 | Nilsson et al. | Sept. 30, 1952 |
| 2,629,166 | Marsten et al. | Feb. 24, 1953 |
| 2,693,023 | Kerridge et al. | Nov. 2, 1954 |
| 2,945,196 | Shanley | July 12, 1960 |
| 2,961,625 | Sion | Nov. 22, 1960 |
| 2,988,718 | Muehlner | June 13, 1961 |

UNITED STATES PATENT OFFICE
CERTIFICATE OF CORRECTION

Patent No. 3,138,776                                              June 23, 1964

Louis R. Jones, Jr.

It is hereby certified that error appears in the above numbered patent requiring correction and that the said Letters Patent should read as corrected below.

Column 1, line 51, for "desrcibed" read -- described --; column 4, line 61, for "impartance" read -- importance --; column 5, line 6, for "FIG. 1" read -- FIG. 7 --; line 16, for "conditions" read -- condition --; same column 5, lines 25 and 26, for "increases" read -- increasing --.

Signed and sealed this 30th day of March 1965.

(SEAL)
Attest:

ERNEST W. SWIDER                                       EDWARD J. BRENNER
Attesting Officer                                           Commissioner of Patents